United States Patent Office 3,277,105
Patented Oct. 4, 1966

3,277,105
ISOXAZOLES
Paul Schmidt, Therwil, Basel-Land, Kurt Eichenberger, Basel, and Max Wilhelm, Allschwil, Switzerland, assignors to Ciba Corporation, New York, N.Y., a corporation of Delaware
No Drawing. Filed Dec. 15, 1964, Ser. No. 418,553
Claims priority, application Switzerland, Dec. 24, 1963, 15,944/63; Oct. 23, 1964, 13,757/64
8 Claims. (Cl. 260—295)

The present invention relates to new isoxazoles. Especially it concerns isoxazoles that contain in position 5 an acylamino radical and in 3-position a pyridyl radical, and in which the acyl radical is the radical of a lower aliphatic carboxylic acid.

The pyridyl radical of the new compounds is preferably the 4-pyridyl radical.

The acyl radical of a lower aliphatic carboxylic acid is above all the acyl radical of a lower alkanoic acid, for example formic, acetic, pivalic, propionic, butyric, valeric or caproic acid.

The new compounds possess valuable pharmacological properties. They possess anthelmintic properties, especially a nematocidal action. They display in animal tests, for example on mice, an effect against nematodes, such as trichostrongylids, e.g. *Nematospiroides dubius*, as well as against oxyurids, and are useful as anthelmintics.

The new compounds can also be used as intermediates, for example in the manufacture of pharmacologically valuable substances.

Special mention deserve the compounds of the formula

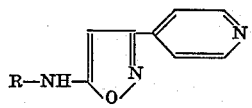

where R represents a lower alkanoyl group, such as the propionyl, acetyl or formyl radical, and above all the 5-acetylamino-3-(4-pyridyl)-isoxazole.

The new compounds are obtained by known methods, for example by reacting an isoxazole containing in the 5-position a free amino group and in the 3-position a pyridyl radical, with a halide, such as a chloride, or an anhydride of a lower aliphatic carboxylic acid.

The reaction of the 5-amino-3-pyridyl-isoxazole with the acid halide or anhydride follows the usual practice and is preferably performed in the presence of an acid acceptor, such as an organic or inorganic base, for example pyridine or an alkali metal carbonate or acetate, advantageously in the presence of a solvent and/or diluent, at room temperature or with cooling or heating, under atmospheric or superatmospheric pressure.

The invention includes also any modification of the present process in which an intermediate obtainable at any stage thereof is used as starting material and any remaining step or steps is/are carried out, or in which the starting materials are formed under the reaction conditions or the reactants are used in the form of their salts.

The reactions of the invention are preferably performed with starting materials that give rise to the abovementioned preferred compounds.

The starting materials can be prepared in known manner. The 5-amino-3-pyridyl-isoxazoles and their salts, such as in particular their therapeutically acceptable acid addition salts, used as starting material are new and likewise have valuable pharmaceutical properties, especially an amoebicidal, fungitstatic or bactericidal action, e.g. an action against tubercle bacilli. They can therefore be used against said pathogens. They are obtained in per se convention manner, e.g. by reacting a corresponding pyridoylacetonitrile with hydroxylamine. Especially valuable on account of its pharmacological properties is the 5-amino-3-(2-pyridyl)-isoxazole and its salts.

The new compounds may be used, for example, in the form of pharmaceutical preparations which contain them in conjunction or admixture with an organic or inorganic, solid or liquid pharmaceutical excipient suitable for enteral, parenteral or local administration. Suitable excipients are substances that do not react with the new compounds, for example water, gelatin, lactose, starches, stearyl alcohol, magnesium stearate, talcum, vegetable oils, benzyl alcohols, gums, propylene glycols, white petroleum jelly, cholesterol or other known medicinal excipients. The pharmaceutical preparations may be, for example, tablets, dragees, capsules, ointments or creams, or in liquid form solutions, suspensions or emulsions. They may be sterilized and/or may contain assistants, such as preserving, stabilizing, wetting or emulsifying agents, solution promoters, salts for regulating the osmotic pressure or buffers. They may also contain other therapeutically valuable substances. The pharmaceutical preparations are formulated in the usual manner.

The new compounds may also be used in the form of animal fodders or of additives to animal fodders, using, for example, the conventional extenders and diluents or animal fodders respectively.

The following examples illustrate the invention without restricting its scope.

EXAMPLE 1

8.05 g. of 5-amino-3-(4-pyridyl)-isoxazole in 50 ml. of acetic anhydride are heated for 4 hours at 100° C. and then cooled. The precipitated crystals are suctioned off and suspended with water. The aqueous suspension is rendered slightly alkaline with a saturated sodium bicarbonate solution and the crystals are suctioned off. Recrystallization from dimethylformamide yields 5-acetylamino-3-(4-pyridyl)-isoxazole of the formula

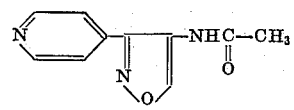

melting at 270 to 272° C. with decomposition.

The 5-amino-3-(4-pyridyl)-isoxazole used as starting material can be prepared in the following manner:

153 g. of hydroxylamine hydrochloride and 146 g. of isonicotinoyl-acetonitrile in 2000 ml. of methanol are refluxed for 4 hours and then cooled. The precipitated crystals are suctioned off and dissolved in 2500 ml. of water containing a small amount of 2 N-hydrochloric acid. The aqueous solution is treated with carbon and filtered. The filtrate is adjusted with sodium carbonate solution to pH 9, and the precipitated crystals are filtered off and crystallized from alcohol, to yield 5-amino-3-(4-pyridyl)-isoxazole of the formula melting at 188 to 191° C.

EXAMPLE 2

4.62 g. of propionic acid chloride are stirred dropwise into 8 g. of 5-amino-3-(4-pyridyl)-isoxazole in 60 ml. of pyridine. The whole is heated for 30 minutes at 90 to 100° C. and then cooled. The reaction solution is stirred into 250 ml. of water, the precipitated crystals are suctioned off and recrystallized from alcohol, to yield 5-propionylamino-3-(4-pyridyl)-isoxazole of the formula

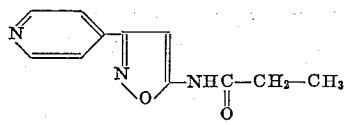

melting at 217 to 219° C.

EXAMPLE 3

15 g. of 5-amino-3-(2-pyridyl)-isoxazole and 86 ml. of acetic anhydride are heated at 100° C. for 4 hours. The reaction solution is then cooled with ice, the crystals that separate are filtered off with suction, washed with ethyl acetate, and recrystallized from water containing a small amount of alcohol. 5-acetylamino-3 - (2-pyridyl)-isoxazole of the formula

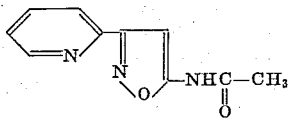

melting at 193–195° C. is obtained.

The 5-amino-3-(2-pyridyl)-isoxazole used as starting material can be prepared as follows:

90 g. of pyridoly-(2)-acetonitrile and 90 g. of hydroxylamine hydrochloride are refluxed in 1200 ml. of methanol for 4 hours. The reaction solution is then evaporated to dryness under reduced pressure. The residue is taken up in water, filtered, and the pH adjusted to 9.5 with sodium carbonate solution, and the aqueous solution extracted with ether. The ethereal solution is dried and evaporated. The residue is recrystallized from benzene. 5-amino-3-(2-pyridyl)-isoxazole of the formula

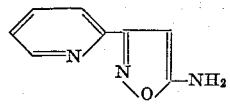

melting at 125–127° C. is obtained.

EXAMPLE 4

Tablets containing 500 mg. of 5-acetylamino-3-(4-pyridyl)-isoxazole and the constituents indicated below can be prepared:

| | Per Tablet, mg. |
|---|---|
| 5-acetylamino-3-(4-pyridyl)-isoxazole | 500.0 |
| Wheat starch | 40.0 |
| Colloidal silicic acid with hydrolyzed starch | 30.0 |
| Arrowroot | 30.0 |
| Magnesium stearate | 6.0 |
| Talc | 19.0 |
| | 625.0 |

Preparation

A mucilage is prepared on a water bath from half the quantity of wheat starch with the four-fold quantity of water. 5-acetylamino-3 - (4-pyridyl)-isoxazole is mixed with the other half of the starch. The mucilage and sufficient water are kneaded in to form a plastic mass. The colloidal silicic acid with hydrolyzed starch is then worked in in portions.

The plastic mass is then forced through a 4–5 mm. mesh sieve, and dried at 45° C. The dried granulate is passed through a 0.8–1.4 mm. mesh sieve and the remaining disintegrating and lubricating agents added. After another homogenization tablets having a diameter of 11.5 mm. and weighing 625 mg. are compressed in the usual manner.

What is claimed is:
1. A compound of the formula

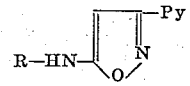

in which R stands for lower alkanoyl and Py for pyridyl.
2. A compound of the formula

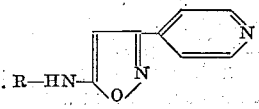

in which R stands for a member selected from the group consisting of propionyl, acetyl and formyl.
3. 5-acetylamino-3-(4-pyridyl)-isoxazole.
4. 5-propionylamino-3-(4-pyridyl)-isoxazole.
5. 5-acetylamino-3-(2-pyridyl)-isoxazole.
6. A compound of the formula

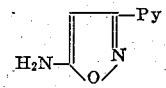

in which Py stands for pyridyl.
7. 5-amino-3-(4-pyridyl)-isoxazole.
8. 5-amino-3-(2-pyridyl)-isoxazole.

References Cited by the Examiner

UNITED STATES PATENTS 2,929,819   3/1960   Erlenmeyer et al. _____ 260—296

WALTER A. MODANCE, *Primary Examiner.*

A. ROTMAN, *Assistant Examiner.*